Feb. 16, 1926.  1,573,606
T. R. HARRISON ET AL
METHOD AND APPARATUS FOR MAKING ELECTRICAL MEASUREMENTS
Filed May 3, 1924

Inventors
Thomas Randolph Harrison
Paul Darwin Foote
By William A. Strauch
Attorney Patented Feb. 16, 1926.

1,573,606

UNITED STATES PATENT OFFICE.

THOMAS RANDOLPH HARRISON, OF PHILADELPHIA, PENNSYLVANIA, AND PAUL DARWIN FOOTE, OF WASHINGTON, DISTRICT OF COLUMBIA.

METHOD AND APPARATUS FOR MAKING ELECTRICAL MEASUREMENTS.

Application filed May 3, 1924. Serial No. 710,913.

*To all whom it may concern:*

Be it known that we, THOMAS RANDOLPH HARRISON and PAUL DARWIN FOOTE, citizens of the United States, residing at Philadelphia, Pennsylvania, and Washington, District of Columbia, respectively, have invented certain new and useful Improvements in Methods and Apparatus for Making Electrical Measurements, of which the following is a specification.

The present invention relates to an improved method and apparatus for making electrical measurements.

More particularly the invention relates to the measurements of current and potential values to indicate or record changes in electrical, physical, chemical, or like conditions, such as occur for example when making pyrometric measurements, and embodies the principles as set forth in connection with Figure 7 of our Patent No. 1,565,093, Dec. 8, 1925, and of which patent the present is a continuation in part.

The apparatus described in the above named patent comprises in combination with an instrument, means for indicating the amount of error due to variations in resistance of the entire circuit in which the instrument is connected, together with means for adjusting the total resistance to compensate for the errors without the necessity of calculation. Besides the expense of such arrangements, the compensation requires an adjustment of resistances to be made which involves the employment of a fair amount of intelligence, and an appreciable amount of time, each time a compensation is to be made and the result is that such arrangements are limited to uses requiring high precision measurements. In practical operation of plants requiring lower precision in measurements, a certain percentage of error in readings is permissible. Errors beyond the allowable range are invariably caused by faults, such as poor contacts, broken leads, short circuiting and the like in the instrument or measuring circuit. The general practice is to test the circuit for faults at intervals with suitable independent instruments and to overhaul the line when the errors become too great. This method results in serious errors creeping into measurements for indeterminate and variable periods, and is more or less unsatisfactory and relatively expensive.

An object of the present invention is to provide a method and apparatus which when used will indicate as frequently as desired the amount of error on the measuring instrument itself, and when this error goes beyond the allowable limits, immediate correction of the fault may be made, rather than a compensation as provided in the above named patent.

A further object of the invention is to provide an arrangement which will be of low cost and may be cheaply applied to existing circuit arrangements.

Further objects of the invention will appear in the appended claims and the following detailed description of preferred embodiments thereof of which—

Figure 1:
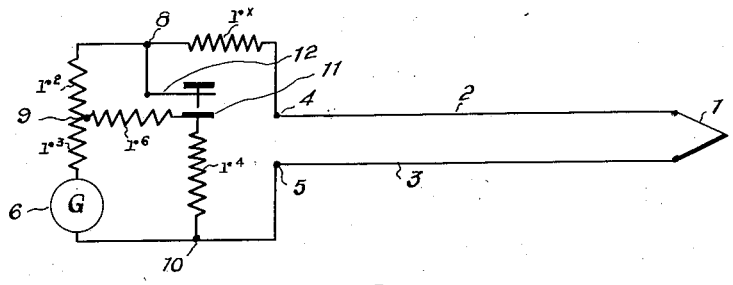
Fig. 1 is a circuit diagram showing one form of the invention.

In the drawing, 1 represents thermo-electric, photo-electric or resistance elements or like devices producing potential or current variations in response to changes in conditions to be measured, such for example as a thermo-couple located at a furnace to indicate temperature changes therein. In pyrometric practice such devices are connected by line conductors 2 and 3, of such resistance that the total value varies from about four to six ohms, with an average of about five ohms. These lines are ordinarily connected at points 4 and 5, to the terminals of an instrument 6 calibrated to indicate the changes in conditions by measuring the variations in current flowing in the circuit which are produced by such changes. Where the values at a plurality of points are to be measured, a selective switch 7 of any well known type is utilized to connect the various devices in the circuit.

In applying the present invention to an instrument serving a single circuit, the variable resistance $r_x$ disclosed in Fig. 1 of the above-named patent is connected in series with the line between points 4 and 8 and is preferably made of and fixed at such value in installing the apparatus as to bring the total resistance included between points 8 and 10 including the resistance $r_x$, line conductors 2 and 3, and the element 1 to a predetermined standard value, for example, about 15 ohms. It will be understood, however, that $r_x$ may be embodied in the line and need not be a separate resistance so long as a suitable predetermined value of line resistance exists. This predetermined total of standard value is represented by $r_1$, in the calculations of the above-named patent. The remainder of the measuring circuit comprises in series with the line, resistance $r_2$ of calculations in the above-named patent between points 8 and 9; and between points 9 and 10, an indicating instrument 6 which may be of the galvanometer type together with a calibrating resistance, the total value of the resistance between points 9 and 10 being $r_3$ of the above named patent. The error indicating auxiliary circuit comprises resistances $r_4$ and $r_6$ connected between points 10 and 11, and 9 and 11, respectively, in a series shunt around $r_3$ and a normally open low resistance shunt branch from point 8 with a key 12 arranged to be actuated to make contact at the junction of resistances $r_4$ and $r_6$.

It will be understood that all the leads in the instrument between points 4 and 5, indicated by straight lines, are of low resistance and may be eliminated so far as possible in the actual construction of the instrument. In accordance with the calculations and principles developed in the above-named patent and which will not be here repeated, the ratios of resistances $r_1$, $r_2$, $r_4$ and $r_6$ are chosen so that the product of $r_1$ and $r_6$ is equal to the product of $r_2$ and $r_4$, or in other words so that $$r_1 = \frac{r_2 r_4}{r_6}$$

For the arrangements disclosed it can be mathematically demonstrated that when the key is closed the error in reading is M times as large as when the key is open, where the value of M is given by the equation $$M = \frac{r_1 + r_2 + r_3 \frac{(r_4 + r_6)}{r_3 + r_4 + r_6}}{r_1 + r_4 - \frac{r_4}{r_3 + r_4 + \frac{r_2 r_6}{r_2 + r_6}}}$$

Making the value of M equal to 2, the difference in deflection of the instrument 6 with key 12 open and with key 12 closed will indicate directly the error in the readings. This ratio may, however, be chosen if desired to magnify the error any desired amount when key 12 is closed by choosing a proper relation of these values.

In operation, with key 12 open, and with the total resistance of the measuring circuit at a predetermined value for which the instrument 6 has been calibrated, the instrument will give substantially accurate readings in chosen quantities of the changes to be measured. As soon as this total predetermined resistance varies, the indications at 6 will no longer be accurate. As frequently as is desired key 12 may be depressed, and when depressed, as demonstrated in the copending case, if the indication remains the same no error exists in the measured indications with the key open. If the deflection changes when 12 is closed, the measuring circuit is out of adjustment and the amount of error introduced will be indicated directly by the degree of deflection. If desired the error may be recorded each time a reading is taken and immediate correction made, or no attention need be paid thereto until it goes beyond the allowable error, and when it assumes such proportions, the entire circuit may be overhauled and correction for the fault may be made.

Figure 2:
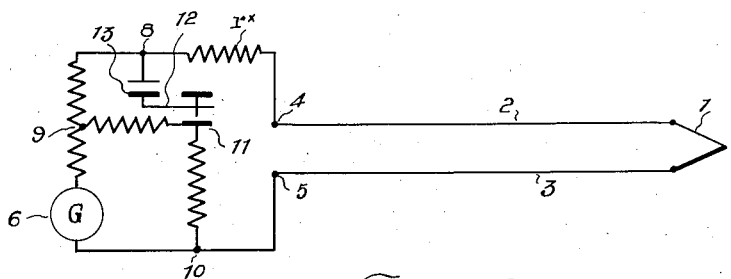
Fig. 2 is a modified circuit arrangement.

In the arrangement shown in Figure 2 a battery 13 may be connected between point 8 and key 12. It is found that this materially increases the sensitiveness of the arrangement for indication of errors when key 12 is closed.

Figure 3:
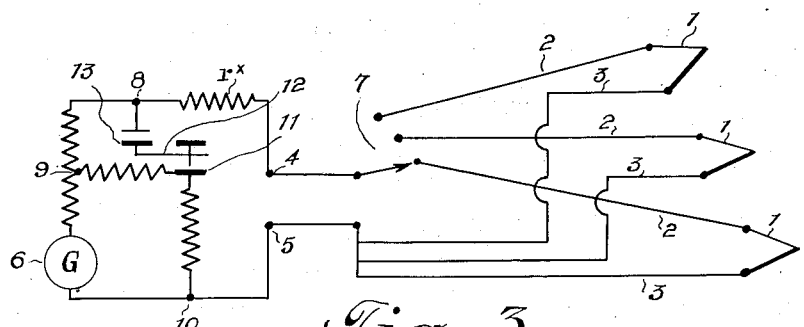
Fig. 3 is the arrangement as applied to a plurality of circuits.

In Fig. 3 an arrangement of a single measuring arrangement for use with a plurality of circuits is shown. In this form the resistance $r_x$ may be fixed preferably at about 10 ohms, with lines varying from 4 to 6 ohms, and the instrument calibrated for a fifteen ohm value of $r_1$ with an allowance of plus or minus one ohm as a permissible variation. If greater accuracy is desired all of the lines may be brought up to a fixed resistance by the addition of suitable resistance elements.

In equipping plants with the present invention, the instruments may be designed to operate for a fixed value of $r_1$, and suitable permanent resistances may be connected in the various lines to bring the line resistance up to the proper value.

Having described preferred embodiments of the invention what is desired to be secured by Letters Patent and claimed as new is:

1. An electrical measuring system comprising a main circuit of fixed predetermined resistance, means connected in said circuit and responsive to changes in conditions external thereto to vary the current flow in said circuit; an instrument calibrated to indicate changes in said external conditions when the resistance of said circuit is at said predetermined value; and auxiliary circuit connections comprising a permanent shunt around said indicating instrument to cause indications of substantial faults in said main circuit.

2. A system as set forth in claim 1 in which the permanent shunt comprises a high resistance.

3. An electrical measuring system comprising a main circuit of fixed predetermined resistance; means connected in said circuit and responsive to changes external thereto to vary the current flow in said circuit; an instrument in said circuit calibrated to indicate the changes in said external conditions when said circuit is at said predetermined value; and auxiliary circuit connections comprising a permanent high resistance shunt and a normally open low resistance shunt around said instrument which when closed causes said instrument to indicate the existence of faults in said main circuit.

4. An electrical measuring system comprising a main circuit of predetermined resistance; means connected in said circuit and responsive to changes in conditions external thereto to vary the current flow in said circuit; an instrument in said circuit calibrated to indicate the changes in said external conditions when the resistance of said circuit is at said predetermined value; and auxiliary circuit connections embodying a source of potential connected in a shunt circuit around said instrument and arranged to cause indication of substantial faults in said main circuit.

5. The combination as set forth in claim 3 together with a source of potential connected in said normally open shunt.

In testimony whereof, we affix our signatures.

T. R. HARRISON.
PAUL D. FOOTE.